UNITED STATES PATENT OFFICE.

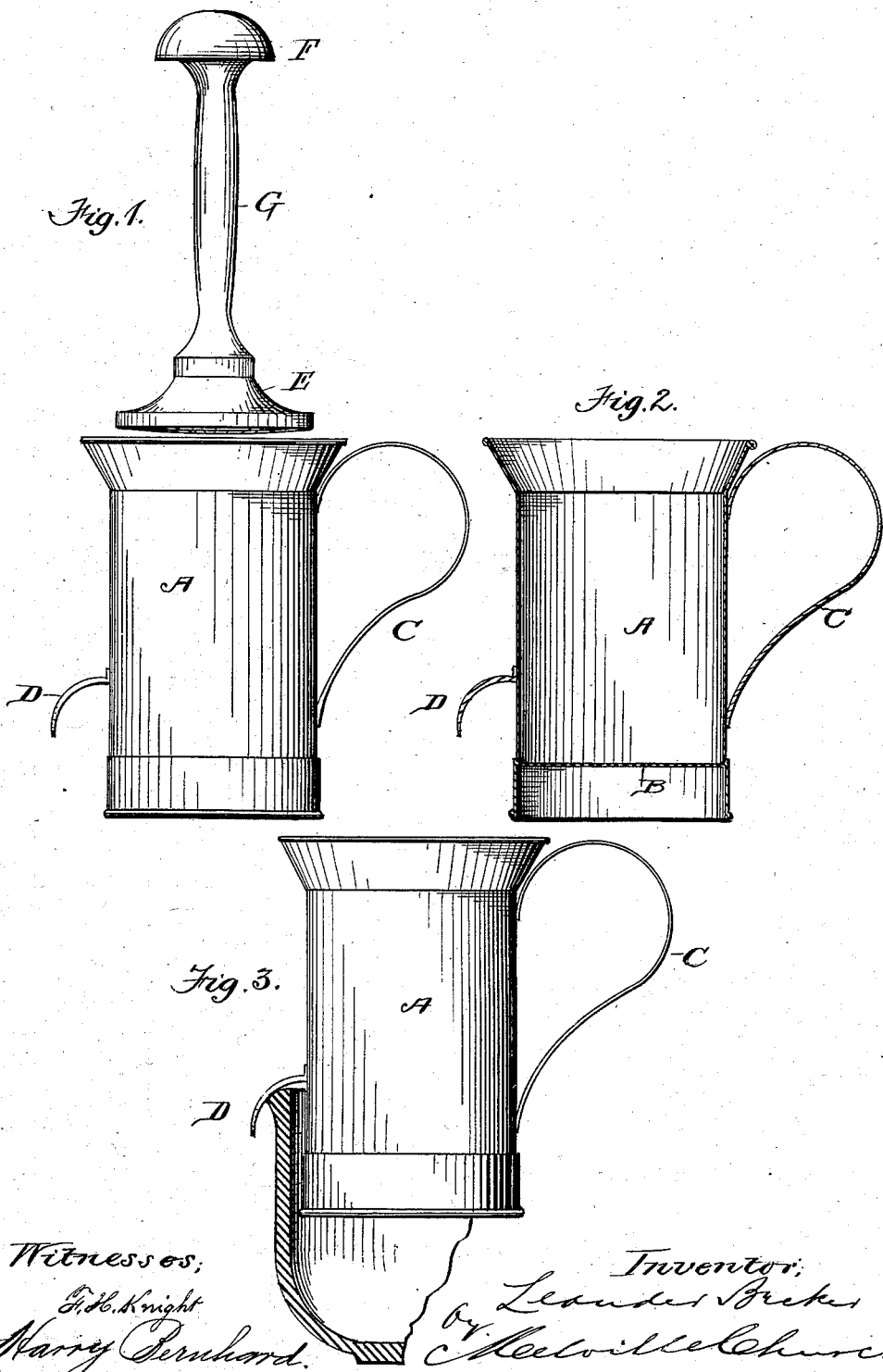

LEANDER BECKER, OF YORK, PENNSYLVANIA.

VEGETABLE MASHER AND STRAINER.

SPECIFICATION forming part of Letters Patent No. 255,570, dated March 28, 1882.

Application filed February 23, 1882. (No model.)

*To all whom it may concern:*

Be it known that I, LEANDER BECKER, of York, in the county of York and State of Pennsylvania, have invented a certain new and Improved Vegetable Masher and Strainer; and I do hereby declare the following to be a full, clear, and exact description of the same, reference being had to the accompanying drawings, forming a part of this specification, in which—

Figure 1 is a view showing the parts of my invention in elevation. Fig. 2 is a sectional view taken longitudinally through the receptacle. Fig. 3 is a view showing the manner of supporting the receptacle on the edge of a vessel or crock.

Similar letters of reference in the several figures denote the same parts.

My invention has for its object to provide for the household a device useful for mashing potatoes, for making apple sauce, preparing cooked dried apples and pumpkins for pies, making country cheese, and which shall be susceptible of many other uses.

To this end the invention consists of a receptacle, preferably of cylindrical form, having a handle by which it can be held by one hand of the operator, and provided with a sieve-bottom, and combined with a plunger provided with a head adapted to fit within the receptacle and having a handle adapted to be grasped by the other hand of the operator when using it.

It further consists in providing the receptacle with a projection for fitting over the edge of a crock or other vessel supporting the receptacle while the plunger is being operated within it.

In the drawings, A represents the receptacle, made preferably of tin, and having the sieve-bottom B and handle C.

D is the projection, which rests upon the edge of the vessel when the device is used, as shown in Fig. 3.

E is the plunger, having the head F, adapted to fit within the receptacle, and provided with a grasping-handle, G.

In using the device the material to be operated upon is placed within the receptacle, and the latter is held by its handle over the vessel in which the contents of the receptacle are to be transferred, the projection D resting on the edge of the vessel, as in Fig. 3. The operator then grasps the handle of the plunger E in his other hand and presses the head of the plunger down into the receptacle, thus forcing out through the sieve-bottom the contained material, or so much thereof as will pass through.

This device can be made very cheaply, and will be found susceptible of many uses in the household.

Having thus described my invention, I claim as new—

1. The combination, with the receptacle having the handle and the sieve-bottom, of the plunger having the handle and the head adapted to fit within the receptacle.

2. The receptacle having the projection for resting upon the vessel into which the contents of the receptacle are to be discharged.

3. The combination of the receptacle having the handle, the sieve-bottom, and the projection for resting on the edge of the receiving-vessel, with the plunger having the handle and head, the whole arranged and operated substantially as described.

LEANDER BECKER.

Witnesses:
GEORGE M. SHETTER,
A. S. SHETTER.